United States Patent [19]

Kakac et al.

[11] 4,153,226
[45] May 8, 1979

[54] SUPPORTING MECHANISM

[75] Inventors: Karel Kakac; Adolf Slezak, both of Brno; Jaroslav Janda, Ceska u Brna, all of Czechoslovakia

[73] Assignee: Vyzkumny a vyvojovy ustav Zavodu vseobecneho strojirenstvi, Brno, Czechoslovakia

[21] Appl. No.: 858,910

[22] Filed: Dec. 8, 1977

[30] Foreign Application Priority Data

Dec. 8, 1976 [CS] Czechoslovakia ............. 8004-76

[51] Int. Cl.² ................................... F16F 15/00
[52] U.S. Cl. ........................... 248/659; 248/358 R
[58] Field of Search .............. 248/18, 20, 358 R, 15; 267/154, 133

[56] References Cited

U.S. PATENT DOCUMENTS

| 1,973,510 | 9/1934 | Schieferstein | 248/20 X |
| 2,704,196 | 3/1955 | Beach | 248/20 |
| 3,090,586 | 5/1963 | Schwegler et al. | 267/154 X |
| 3,612,452 | 10/1971 | Harvanke | 248/20 |

FOREIGN PATENT DOCUMENTS

| 469407 | 11/1928 | Fed. Rep. of Germany | 248/18 |
| 2430441 | 1/1975 | Fed. Rep. of Germany | 248/20 |
| 1430369 | 1/1966 | France | 267/154 |
| 111958 | 9/1944 | Sweden | 248/20 |

Primary Examiner—J. Franklin Foss

[57] ABSTRACT

A supporting mechanism particularly adapted for supporting weaving machines on a base by means of which the machine frame of the weaving machine is suspended by cables which are adjustably secured on four support levers. Four support brackets are disposed at the four corners of the machine frame and rest on the ground or a base. Each bracket is provided with a bearing and each lever is provided with a fulcrum. Two torque rods are provided, one on each side of the machine frame. Each torque rod is rigidly secured to one lever and to an oppositely disposed bracket. By virtue of the coaction of the suspension support of the machine frame by four cables, the pivot support supplied by coacting bearings and fulcrums and the action of the torque rods the weaving machine is cushioningly supported by the support mechanism.

6 Claims, 2 Drawing Figures

SUPPORTING MECHANISM

BACKGROUND OF THE INVENTION

The present invention relates to a supporting mechanism, particularly suitable for supporting weaving machines.

Weaving machines are usually fixed to a solid base, e.g. the floor, by simple means, such as anchor bolts. However, modern weaving machines must absorb large impact forces and oscillations during their operation particularly from the slay beating up of weft threads, due to their rather considerable mass. The forces created by the impacts and oscillations are transmitted to the weaving shop floor at the point where the machine is anchored and cause an undesired vibration thereof. This is disadvantageous, particularly when the machine is mounted on a higher floor than the ground floor. Shocks and vibrations imparted to the shop floor reduce considerably the useful life of the factory buildings. Moreover, the machines are excessively stressed and also the noise level in the workshops is higher. It is already known to use cushioning by supporting the machine frame at its point of operation by using elastic materials. However, the effect of such cushioning is nearly negligible. However, such arrangement tends also to cause the machine to vibrate on the elastic supporting cushions.

Another arrangement is known, in which the weaving machine is swingably mounted on cushion supports about an axis parallel to the axis of the swinging motion of the slay. A spring type vibration damper is arranged on the swinging side of the machine. The spring is mounted in a guide sleeve, which is provided with cylindrical projections with friction inserts cooperating closely with small cylinders, which are spring loaded by plate springs by means of screws. The guiding sleeve is swingably connected to the upper plate, while said upper plate is swingably connected to a cylindrical support provided with a lug, which bears against the workshop floor. The device is very complex and its cushioning effect is insufficient.

SUMMARY OF THE INVENTION

The above described disadvantages and shortcomings are mitigated by the supporting mechanism in accordance with the present invention. The mechanism is formed by supporting levers mounted swingably on a solid base and a spring biased against the effect of the machine weight, the machine frame being mounted on said supporting levers.

The principal advantage of the supporting mechanism in accordance with the present invention consists in that the impacts and vibrations caused by the operation of the weaving machine are considerably reduced. By virtue of the supporting mechanism of the invention it is now possible to mount machines on higher floors by limiting the effect of impacts and vibrations at the points where the machine is mounted on the floor. In addition thereto, the stresses imparted to various parts of the machine are reduced and its noise level during operation is also reduced. Moreover, the mechanism is simple in construction and reliable in operation.

BRIEF DESCRIPTION OF THE DRAWING

The preferred embodiment of the invention is illustrated in the accompanying drawing forming part of the detailed description and in which.

DESCRIPTION OF THE PREFERRED EMBODIMENT

Figure 1:
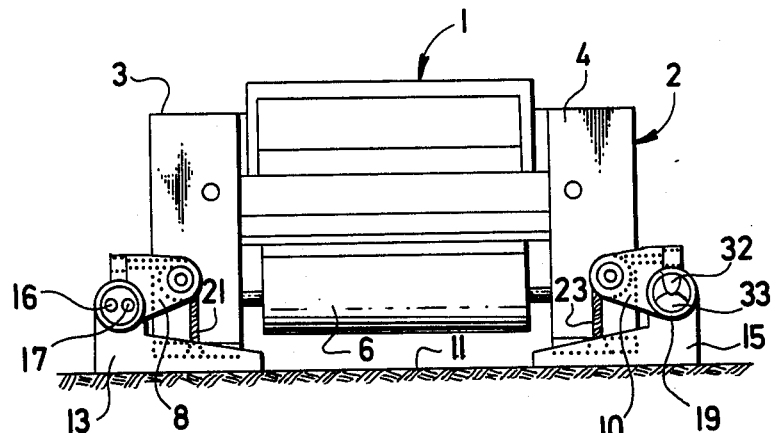
FIG. 1 is a front elevational view of a supporting mechanism of the weaving machine in accordance with the invention.

The weaving machine generally designated 1 is illustrated only diagramatically in the drawing, and its basic part forms frame 2 including side plates 3 and 4. Additional parts of the weaving machine are operatively mounted between the side plates 3 and 4. These parts are not illustrated in detail because they do not form an essential part of the invention, e.g. warp beam 5, cloth beam 6 and other parts.

Frame 2 of the weaving machine 1 is mounted on supporting levers 7, 8, 9, 10 of the supporting mechanism. Each supporting lever 7, 8, 9, 10 is swingably and pivotally mounted relative to a solid base 11 and is biased and thereby cushioned against the action of the weight of the weaving machine 1.

In the illustrated embodiment the mechanism of the invention is advantageously formed by four supporting levers 7, 8, 9, 10. Each lever is swingably mounted on a stationary bracket 12, 13, 14, 15 and these brackets rest on the base 11. Each supporting lever 7, 8, 9, 10 is provided with a fulcrum 32, by means of which it is pivotally mounted in bearing 33 forming part of each bracket 12, 13, 14, 15. Levers 7, 8, 9, 10 are respectively cushioned by torque rods 16, 17 and two further rods (not represented). Each rod 16, 17 is respectively fixed to the pair of brackets on each side of the machine.

Figure 2:
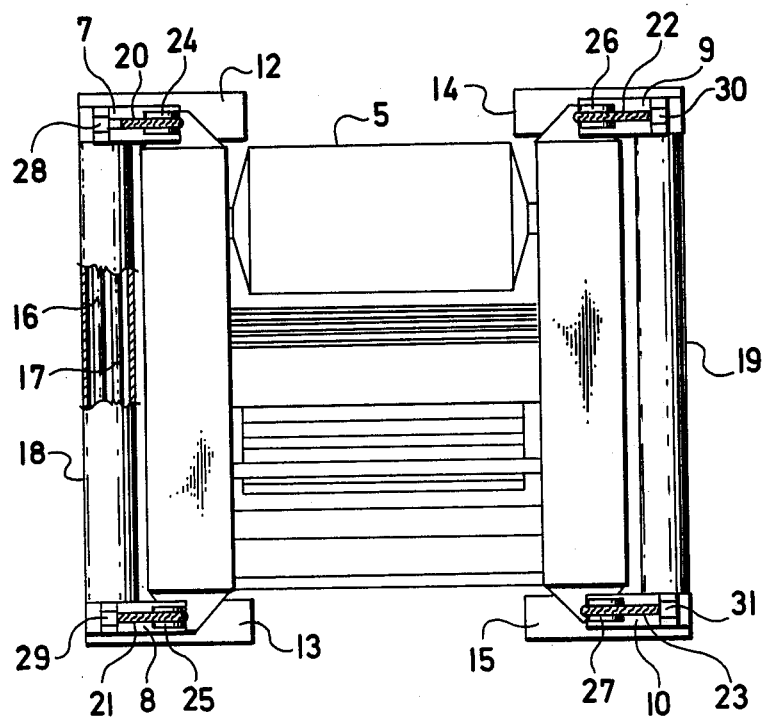
FIG. 2 is a plan view of the supporting mechanism as shown in FIG. 1.

The supporting levers 7, 8, 9, 10 are arranged together with their brackets 12, 13, 14, 15 into two pairs, in the first of which torque rod 16 of supporting lever 7 is anchored in bracket 13 of supporting lever 8 and torque rod 17 of supporting lever 8 is anchored in bracket 12 of supporting lever 7. This mounting is constructed in a correspondingly similar manner also in the second pair, consisting of supporting lever 9 on bracket 14 and supporting lever 10 on bracket 15. The latter connection is, however, not illustrated in FIGS. 1 and 2 for simplification. Moreover, supporting levers 7, 8 and 9, 10 of each pair can be fixedly connected to each other, thereby coupling their swinging motion. This is particularly advantageous in weaving machines, in which the direction of impacts is along the longitudinal axis of the machine and in which the center of gravity of the machine 1 is displaced due to the unwinding of the warp threads from warp beam 5 and due to the winding of woven goods on the cloth beam 6.

In the illustrated embodiment, the supporting levers 7, 8 and 9, 10 of each pair are also connected to each other by means of tubular members 18 and 19. The torque rods 16 and 17 are mounted in the bores of the tubular members 18 and 19.

The actual mounting of the machine on the supporting mechanism is performed by suspension cables 20, 21, 22 and 23. Each cable 20, 21, 22, 23 is anchored on the machine frame 2 and guided via rotatable pulleys 24, 25, 26, 27 of supporting levers 7, 8, 9, 10 on which said cable is fixed by means of an adjusting screw 28, 29, 30, 31.

The manner of assembly and mounting the weaving machine 1 on the supporting mechanism is quite simple. The fully equipped machine 1 is deposited on a solid base, i.e. the workshop floor. The suspension cables 20, 21, 22, 23 are anchored in the machine frame 2. By slowly turning the adjustment screws 28, 29, 30, 31, the machine 1 is lifted above the base 11 and is then prepared for operation. The weaving machine 1 swings during operation on suspension cables 20, 21, 22, 23, this making possible a displacement in a horizontal plane including a turning about a vertical axis, a swinging motion also on the torque rods which is inhibited by the rigidity of tubular members 18, 19 can all be carried out. The combination of these motions and the forces creating them favor a motion in a direction substantially parallel to the floor of the machine 1.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A supporting mechanism for weaving machines mounted on a base, comprising in combination,
a plurality of supporting levers,
a corresponding plurality of support brackets mounted on said base, each lever being pivotally supported on a bracket and biased against the weight of the weaving machine,
said weaving machine having a frame, said frame being operatively connected to said plurality of supporting levers; and
a pair of torque rods, each torque rod being operatively secured, on the one hand, to a supporting lever and, on the other hand, to a bracket disposed oppositely said supporting lever.

2. The supporting mechanism, as set forth in claim 1, wherein said plurality of supporting levers and supporting brackets are arranged in pairs, a torque rod being secured to one supporting lever and one bracket in each pair thereof.

3. The supporting mechanism as set forth in claim 2, including means for rigidly securing each pair of supporting levers to each other.

4. The supporting mechanism as set forth in claim 3, wherein said securing means are formed by a tube having an axial bore, at least one torque rod being disposed in each tube.

5. The supporting mechanism as set forth in claim 4, including suspension cable means, said cable means being adjustably secured to each supporting lever, and to said frame.

6. The supporting mechanism as set forth in claim 5, wherein each lever of said plurality of supporting levers is provided with fulcrum means, each bracket of said plurality of support brackets is provided with bearing means, said fulcrum means and bearing means coacting to swingably support said weaving machine.

* * * * *